United States Patent
Fischer et al.

(10) Patent No.: US 7,024,318 B2
(45) Date of Patent: Apr. 4, 2006

(54) DEVICE FOR MEASURING THE TIRE PRESSURE OF ANY WHEEL ON A MOTOR VEHICLE AND METHOD FOR OPERATING THE DEVICE

(75) Inventors: Frank Fischer, Linkenheim Hochstetten (DE); Dominik Fuessel, Dietzenbach (DE); Martin Prenninger, Regensburg (DE); Martin Fischer, Regensburg (DE); Franz Hillenmayer, Burglengenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/238,549

(22) Filed: Sep. 10, 2002

(65) Prior Publication Data

US 2003/0065458 A1 Apr. 3, 2003

(30) Foreign Application Priority Data

Sep. 10, 2001 (DE) .................. 101 44 359

(51) Int. Cl.
  *G01F 1/00* (2006.01)
  *G01F 7/00* (2006.01)
  *G06F 19/00* (2006.01)

(52) U.S. Cl. .......................... 702/47; 340/438

(58) Field of Classification Search .............. 702/188, 702/47; 73/146; 340/442–447, 438; 701/1, 701/93; 152/152.1; 156/123; 141/5, 7, 141/59; 220/4.14
See application file for complete search history.

(56) References Cited

U.S. PATENT DOCUMENTS

| | | | |
|---|---|---|---|
| 3,810,090 A * | 5/1974 | Davis et al. ................ 340/447 |
| 4,186,377 A | 1/1980 | Barabino .................... 340/446 |
| 4,210,898 A | 7/1980 | Betts ........................... 340/58 |
| 5,284,267 A * | 2/1994 | Polletta et al. ............. 220/4.14 |
| 5,500,065 A * | 3/1996 | Koch et al. .................. 156/123 |
| 5,569,848 A | 10/1996 | Sharp .......................... 73/146 |
| 5,573,611 A * | 11/1996 | Koch et al. .............. 152/152.1 |
| 5,585,554 A | 12/1996 | Handfield et al. ............. 73/146 |
| 5,717,135 A | 2/1998 | Fiorletta et al. .............. 73/146 |
| 5,895,846 A | 4/1999 | Chamussy et al. ......... 73/146.2 |
| 6,043,737 A | 3/2000 | Shehan et al. .............. 340/442 |
| 6,112,165 A | 8/2000 | Uhl et al. .................... 702/138 |
| 6,167,920 B1 * | 1/2001 | Enge ............................. 141/5 |
| 6,243,007 B1 | 6/2001 | McLaughlin et al. ........ 340/447 |
| 6,253,802 B1 * | 7/2001 | Enge ........................... 141/59 |
| 6,275,148 B1 | 8/2001 | Takamura et al. .......... 340/442 |
| 6,278,361 B1 * | 8/2001 | Magiawala et al. ......... 340/438 |
| 6,278,363 B1 | 8/2001 | Bezek et al. ................ 340/442 |
| 6,340,930 B1 | 1/2002 | Lin ............................. 340/447 |
| 6,349,246 B1 * | 2/2002 | Smith et al. .................... 701/1 |
| 6,408,690 B1 | 6/2002 | Young et al. .................. 73/146 |
| 6,434,470 B1 * | 8/2002 | Nantz et al. .................. 701/93 |
| 6,435,020 B1 | 8/2002 | Oldenettel et al. ......... 73/146.4 |
| 6,441,732 B1 * | 8/2002 | Laitsaari et al. ......... 340/539.1 |

(Continued)

FOREIGN PATENT DOCUMENTS

DE        4014379        11/1991

(Continued)

*Primary Examiner*—Michael Nghiem
*Assistant Examiner*—Aditya Bhat
(74) *Attorney, Agent, or Firm*—Baker Botts L.L.P.

(57) ABSTRACT

In a tire pressure measurement system a display indicating whether a tire (1) has an inadmissible or incorrect tire pressure and which tire (1) has inadequate tire pressure, is only activated when the driver stops to refuel. One or more sensors (6) are located near to the tank for this purpose and these identify a fuel stop.

11 Claims, 1 Drawing Sheet

U.S. PATENT DOCUMENTS

| | | |
|---|---|---|
| 6,443,190 B1 * | 9/2002 | Enge .................................. 141/7 |
| 6,448,891 B1 | 9/2002 | Barnett ......................... 340/438 |
| 6,453,737 B1 | 9/2002 | Young et al. .................... 73/146 |
| 6,591,668 B1 | 7/2003 | Becherer et al. ............... 73/146 |
| 6,622,553 B1 * | 9/2003 | Hayashi et al. ................. 73/146 |
| 6,693,522 B1 | 2/2004 | Tang et al. .................... 340/445 |
| 6,748,799 B1 | 6/2004 | Fischer et al. ............... 73/146.5 |
| 2002/0075145 A1 * | 6/2002 | Hardman et al. ............ 340/442 |
| 2002/0095980 A1 * | 7/2002 | Breed et al. .................... 73/146 |
| 2002/0116156 A1 * | 8/2002 | Remboski et al. ........... 702/188 |
| 2002/0121132 A1 * | 9/2002 | Breed et al. .................... 73/146 |
| 2002/0130771 A1 * | 9/2002 | Osborne et al. ............. 340/438 |
| 2002/0149477 A1 * | 10/2002 | Desai et al. .................. 340/442 |
| 2003/0006893 A1 * | 1/2003 | Dunbridge et al. .......... 340/444 |
| 2003/0076222 A1 | 4/2003 | Fischer et al. ............... 340/442 |

FOREIGN PATENT DOCUMENTS

| | | |
|---|---|---|
| DE | 4224498 | 1/1994 |
| DE | 4232240 | 3/1994 |
| DE | 43 03 583 | 2/1996 |
| DE | 196 02 593 C1 | 5/1997 |
| DE | 196 08 479 | 5/1997 |
| DE | 19602593 C1 | 5/1997 |
| DE | 19650687 A1 | 6/1998 |
| DE | 19522486 | 4/1999 |
| DE | 19852814 A1 | 6/1999 |
| DE | 198 56 861 | 6/2000 |
| DE | 199 13 733 | 9/2000 |
| DE | 199 21 413 C1 | 11/2000 |
| DE | 19933512 A1 | 1/2001 |
| DE | 102 47 761 A1 | 6/2003 |
| EP | 0 221 522 | 10/1986 |
| EP | 0 861 160 | 11/1996 |
| EP | 0931679 | 1/1999 |
| EP | 0 967 095 | 6/1999 |

* cited by examiner

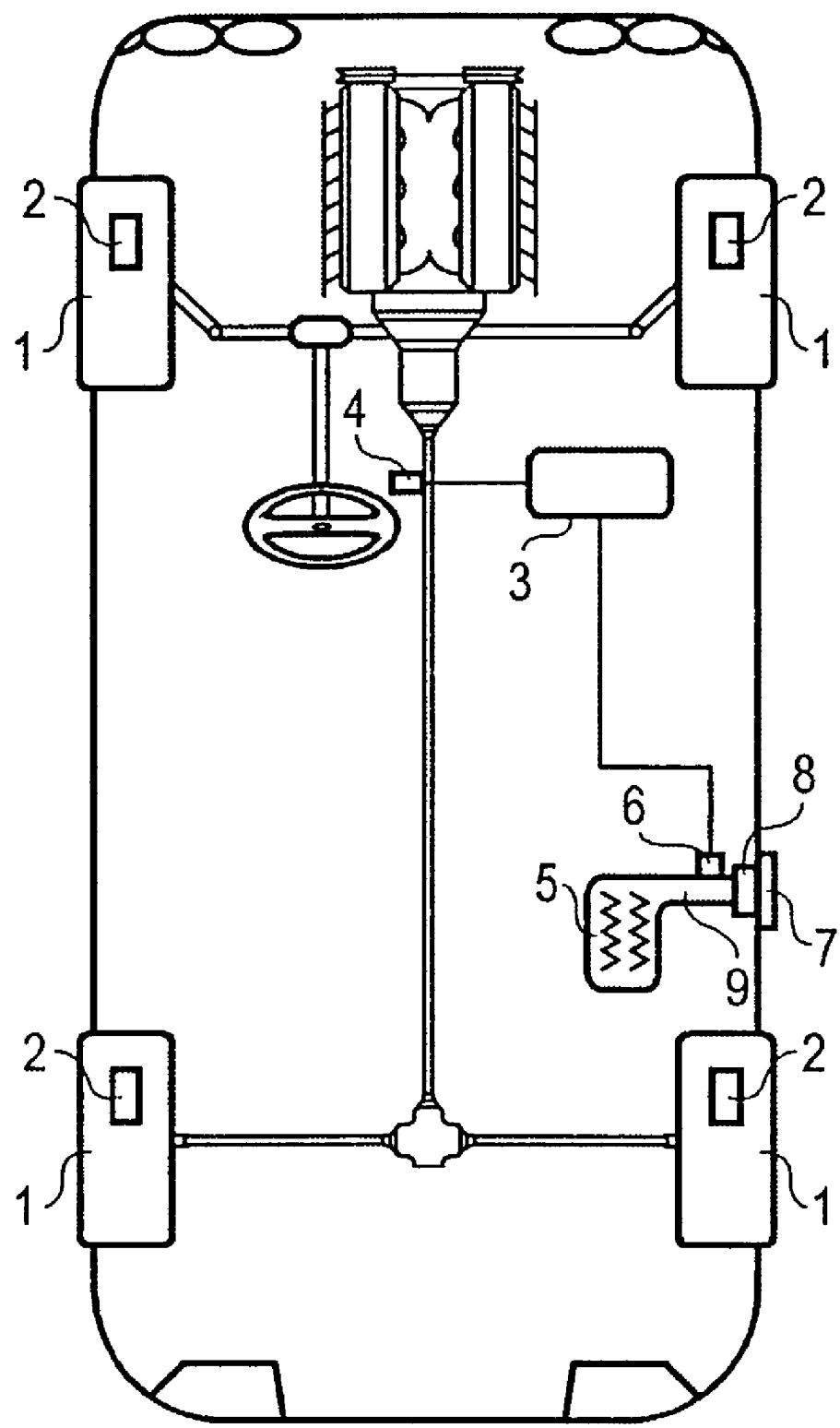

DEVICE FOR MEASURING THE TIRE PRESSURE OF ANY WHEEL ON A MOTOR VEHICLE AND METHOD FOR OPERATING THE DEVICE

BACKGROUND OF THE INVENTION

The invention relates to a device for measuring the tire pressure of any wheel on a motor vehicle according to the preamble of claim 1. It also relates to a method for operating this tire pressure measurement device.

A known device (DE 196 02 593 C1) specifically has tire pressure sensors inside the tire of any wheel, which measure the air pressure or tire pressure level inside the tire. The air pressure is transmitted in the form of a measured value to an analysis unit located on the vehicle. The analysis unit com-pares the air pressure in the tire with a reference value or with deviations from the reference value predefined by limit values. If the measured values are above or below these limit values, the analysis unit can warn the driver that the tire pressure is too high or too low.

Tire pressure is measured at time intervals and transmitted to the analysis unit. The values are displayed continuously to the driver at rather longer intervals, for example with the message that the driver should check and if necessary increase the tire pressure on a specific wheel at the next fuel stop. As the driver cannot always stop to correct the tire pressure when the message appears, it can happen that the message is forgotten with the passage of time and therefore ignored. There is then a risk of excessive pressure loss, associated with the risk of accident.

SUMMARY OF THE INVENTION

The object of the invention is to create a device for measuring the tire pressure of any wheel on a motor vehicle and a method for operating the device, with which the driver is only in-formed as necessary of inadequate tire pressure.

This object is achieved in one embodiment with a device for measuring the tire pressure of any wheel on a vehicle with a tire pressure measurement device in each tire, each of which has sensors which measure the tire pressure directly or physical variables dependent on the tire pressure, an analysis unit in the motor vehicle, which communicates in a wireless fashion with the tire pressure measurement devices, by means of which the measured tire pressure or the physical variables are sent to the analysis unit, in which it is determined using the measured variables whether the pressure in one or more tires is inadmissible or in-correct, which then causes a display signal to be generated, and a display unit, by means of which an inadmissible or in-correct tire pressure is displayed to the driver by means of the display signal, wherein a sensor is connected to the analysis unit, which for its part identifies whether a fuel stop has been made and re-ports this to the analysis unit, as a result of which the display of the inadmissible or incorrect tire pressure is activated.

Another embodiment is a device for measuring the tire pressure of any wheel on a vehicle with a tire pressure measurement device in each tire, each of which has sensors which measure the tire pressure, an analysis unit in the motor vehicle, which communicates in a wireless fashion with the tire pressure measurement de-vices, by means of which the measured tire pressure is sent to the analysis unit, in which it is determined using the measured variables whether the pressure in one or more tires is inadmissible or in-correct, which then causes a signal to be generated, wherein a sensor is connected to the analysis unit, which for its part identifies whether a fuel stop has been made and re-ports this to the analysis unit, as a result of which the inadmissible or incorrect tire pressure is signaled.

Furthermore, the device may comprise a display or an acoustic output device for displaying or signaling the inadmissible or incorrect tire pressure.

A method for operating a tire pressure monitor system, comprises the steps of
monitoring the tire pressure of any tire continuously,
determining from the tire pressures measured whether the tire pressure is inadmissible or incorrect, and
identifying a fuel stop and in case of an inadmissible or incorrect tire pressure generating a warning signal.

With these the tire pressure is recorded continuously in each tire using a tire pressure measurement device and transmitted to a central analysis unit in the motor vehicle. The measured values are analyzed there and it is determined whether the tire pressure in any tire is inadequate or incorrect. An inadequate pressure display is then activated when the driver stops to re-fuel.

Other advantageous embodiments of the invention are set out in the dependent claims.

BRIEF DESCRIPTION OF THE DRAWING

Examples of embodiments of the invention are described in more detail below using the diagrammatic drawing. The single FIGURE shows a block diagram of a device to measure the tire pressure of any tire on a motor vehicle.

DETAILED DESCRIPTION OF THE PREFERRED EMBODIMENTS

A device for measuring the tire pressure of any tire on a vehicle has a tire pressure measurement device 2 in each tire 1 (including the spare wheel). These are used to measure the pressure in the tire 1 directly and/or the temperature of the tire 1, as a physical variable which is a measure of the pressure in the tire 1. The measured physical variable is converted to an electrical signal and transmitted to a central analysis unit 3.

The physical variables (measured values) in the tire 1 are measured intermittently, in other words at predefined time intervals. The measured values are transmitted along with tire-specific identification codes to the analysis unit 3, where the measured values are processed as required.

It is determined from the measured values whether the tire pressure in at least one of the tires 1 is inadmissible or in-correct. For this purpose the measured values can, for example, be compared with stored reference values. The target pressure for each tire 1 can be stored beforehand in a memory as a reference value. The reference values may depend on the current loading of the motor vehicle, the temperature in the tire 1, the external temperature, the external air pressure or other variables affecting the tire pressure.

The analysis unit 3 therefore determines the pressure conditions in each tire, by, for example, comparing each measured value for any wheel with the relevant reference value. If the measured value exceeds a predefined deviation in respect of the reference value, in other words the value is above or below predefined limit values based on the reference value, a message can be sent to the driver.

This is generally achieved via a display unit 4 on the dash-board, by means of which the location of the tire 1 (wheel position) is displayed and a message is displayed stating whether the pressure is too high or too low, in other words whether the tire pressure is inadmissible or incorrect.

The way in which it is determined whether the air pressure in one or more tires 1 is inadequate or incorrect is irrelevant for the invention. What is important is that inadequate or in-correct tire pressure is in fact identified and that notification of this is given to the driver, and at a time when it is possible to correct the tire pressure, for example as is the case when the driver stops to refuel at a fuel station.

The tire pressure in any tire 1 (this also includes the spare tire) can be measured both when the vehicle is in motion and when it is stationary (parked).

According to the invention the display on the display unit 4 is activated, as a minimum, when the driver stops to refuel. For this, there are one or more sensors 6 near to the fuel tank 5 and these identify whether the fuel compartment flap 7 has been raised, the fuel cap 8 has been opened or the vehicle is being refueled via the filler neck 9. Other sensors can also be interrogated, which indirectly or directly identify a fuel stop.

For example, a contact sensor can be used to determine whether the filler neck 9 is open, in other words whether the fuel cap 8 has been opened or the fuel compartment flap 7, which gives access to the fuel cap 8 from outside, is open. The sensor 6 then reports this data to the analysis unit 3, which then verifies whether there is a display signal, in other words whether the pressure in a tire 1 is inadmissibly high or low. If this is the case, the display unit 4 is activated.

A level sensor already in or on the fuel tank 5 can also be used to identify whether the vehicle is being refueled. This sensor 6 then reports the data "Fuel stop identified" to the analysis unit 3.

Approach sensors can also be fitted on the filler neck 9, which identify insertion of the fuel dispenser into the filler neck 9 or which identify the flow of the fuel through the filler neck 9.

A fuel compartment flap switch inside the vehicle can also be used as a sensor 6. When drivers want access to the tank for refueling, they operate this switch. Operation of the switch opens or unlocks the fuel compartment flap. The switch signal can then be used as a sensor signal to identify a fuel stop.

It is irrelevant for the invention what type of sensor 6 is used to identify a fuel stop. It is however important that an activation signal is sent to the analysis unit 3 as a result of identification of a fuel stop, on the basis of which a message about excessively high or low pressure or incorrect tire pressure in the tires 1 is activated.

This means that the driver receives information directly while refueling or immediately after refueling (when the driver is back at the wheel) that the tire pressure is inadequate and should be increased. As it is possible at every fuel station to add air to or remove air from the tires 1, it is advantageous to display the message or remind the driver during or after the fuel stop. The error message about inadmissible excessively high or low pressure is therefore generated when a stop has been made and at a place where there are means available to top up the air in the tires 1.

The message about inadequate or incorrect tire pressure can be displayed visually to the driver and an acoustic message can also be relayed when the driver refuels the vehicle. This means that the driver receives a message while refueling to the effect that the tire pressure in a tire 1 is not as it should be and immediate action can be taken to rectify the problem.

The visual display can indicate to the driver which tire 1 in which wheel position has excessively high or low pressure (screen, display, digital display, etc.). The additional acoustic message can be configured so that a different signal indicates to the driver which tire 1 requires a tire pressure correction. Different tones/melodies or the number of tones can inform the driver which tire 1 has excessively low tire pressure.

The optical display unit 4 can then be activated via the display signal, as soon as excessively high or low pressure is identified in a tire 1. The acoustic display or additional visual display is then generated when the fuel stop is identified. The driver is then reminded again that the tire pressure is in-adequate.

The invention claimed is:

1. Device for measuring the tire pressure of any wheel on a vehicle with
    a tire pressure measurement device in each tire, each of which has sensors which measure the tire pressure directly or physical variables dependent on the tire pressure,
    an analysis unit in the motor vehicle, which communicates in a wireless fashion with the tire pressure measurement devices, by means of which the measured tire pressure or the physical variables are sent to the analysis unit, in which it is determined whether the pressure in one or more tires is inadmissible or incorrect, which then causes a display signal to be generated;
    a display unit, by means of which an inadmissible or incorrect tire pressure is displayed to the driver by means of the display signal;
    wherein a sensor connected to the analysis unit provides the analysis unit an indication of whether a fuel stop has been made, as a result of which the display of the inadmissible or incorrect tire pressure is activated; and
    the sensor comprises an electromechanical sensor near the fuel cap which identifies an open filler neck or an open fuel compartment flap.

2. Device according to claim 1, wherein the sensor comprises a fuel level sensor, which provides the indication to the analysis unit.

3. A method for operating a tire pressure monitor system, comprising the steps of
    monitoring the tire pressure of any tire continuously,
    determining from the tire pressures measured whether the tire pressure is inadmissible or incorrect,
    identifying when a fuel stop occurs via monitoring for an open fuel compartment filler neck or an open fuel compartment flap, and
    in case of an inadmissible or incorrect tire pressure, generating a warning signal in response to the fuel stop.

4. A method according to claim 3, wherein the warning signal comprises a display message.

5. A method according to claim 3, wherein the warning signal comprises an acoustic message.

6. A method according to claim 3, wherein an identified inadmissible or incorrect tire pressure in at least one tire is displayed visually and wherein an identified fuel stop results in an acoustic message if the tire pressure is inadmissible or incorrect.

7. A method according to claim 3, wherein the respective wheel position of the tire or tires with an inadmissible or incorrect tire pressure is displayed.

8. A system for measuring the tire pressure of a wheel on a vehicle, said system comprising
    a tire pressure measurement device in each tire, each of which has sensors which measure the tire pressure,
    an analysis unit in the motor vehicle, which communicates in a wireless fashion with the tire pressure measurement devices, by means of which the measured tire pressure is sent to the analysis unit, in which it is determined using the measured variables whether the pressure in one or more tires is inadmissible or incorrect, which then causes a signal to be generated, a sensor connected to the analysis unit, said sensor identifies whether a fuel stop has been made and reports this to the analysis unit, as a result of which the inadmissible or incorrect tire pressure is signaled, and the sensor comprising is an electromechanical sensor, near to the fuel cap, which identifies an open filler neck or an open fuel compartment flap.

9. A system according to claim 8, further comprising a display for displaying said inadmissible or incorrect tire pressure.

10. A system according to claim 8, further comprising an acoustic output device for signaling said inadmissible or incorrect tire pressure.

11. A system according to claim 8, wherein the sensor comprises a fuel level sensor, which identifies when the vehicle is refueled.

* * * * *